May 26, 1931.  J. F. MARTIN ET AL  1,807,340

OILER

Filed March 3, 1928

INVENTOR
John F. Martin
& Frank E. Watts
BY
ATTORNEY

Patented May 26, 1931

1,807,340

UNITED STATES PATENT OFFICE

JOHN F. MARTIN AND FRANK E. WATTS, OF SPRINGFIELD, MASSACHUSETTS, ASSIGNORS TO AMERICAN BOSCH MAGNETO CORPORATION, OF SPRINGFIELD, MASSACHUSETTS, A CORPORATION OF NEW YORK

OILER

Application filed March 3, 1928. Serial No. 258,883.

This invention relates to oilers, and more particularly to one adapted to be used in mechanism requiring limited lubrication, such as magnetos and the like, though, of course, the invention is not limited in its scope of application.

The principal object of this invention is to provide an oiling element which can be made to supply positively any desired degree of lubrication to the operative elements of the mechanism to which it is applied, and which at the same time is so constructed as to make over-oiling impossible.

Another object of the invention is to provide an oiler which is simple in construction, inexpensive to manufacture and readily disposed in any device to which it may prove adaptable.

The oiler is so arranged on the mechanism as to be readily accessible to the hand of the operator.

The invention consists, broadly, in providing an axially adjustable element, such as a screw, which is preferably provided with a spatulated stem or other means for preventing the oiler from being removed from the casing. The casing is preferably provided with an internally threaded elongated bore to receive the oiler, and for the purpose of "locking" the oiler in said casing there is provided a washer which cooperates with the aforementioned stem to prevent the oiler from being removed.

More particularly, the preferred embodiment, illustrated in the accompanying drawings, comprises a unitary and integral body having a knurled head, a chamfered seat, a threaded portion, pilot and stem. The washer is a punching having a chamfered edge which is slipped over the stem in the initial assembly, and the end of the stem is then flattened.

Figure 1:
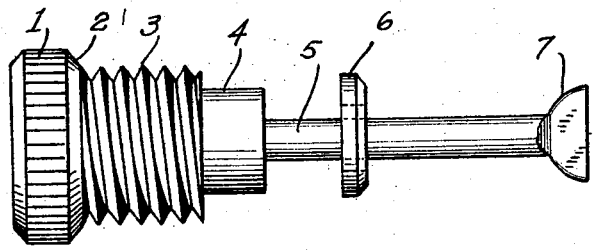
Figure 2:
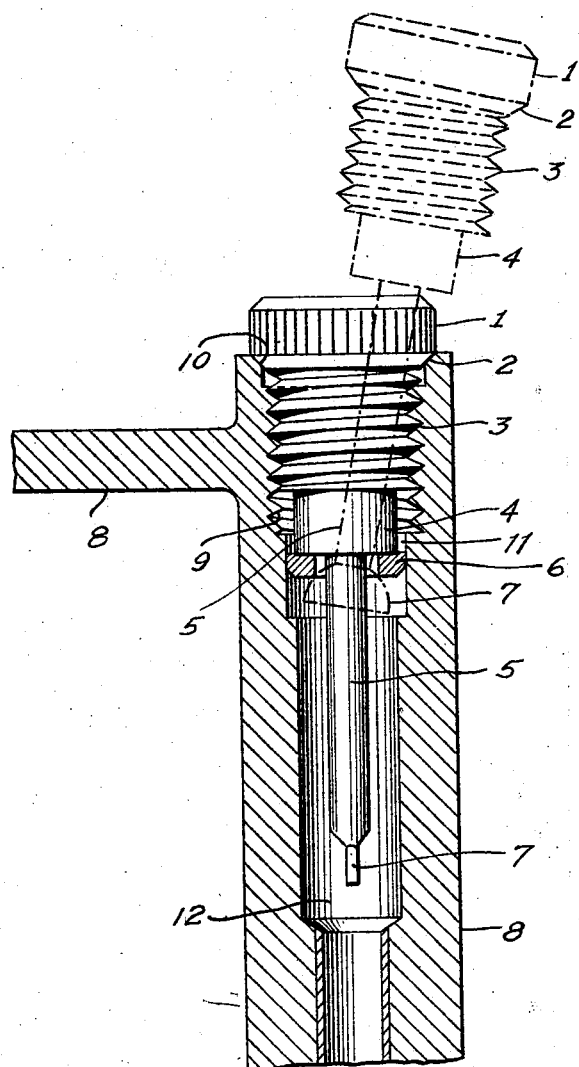

In said drawings,

Fig. 1 is a front view of the oiler; and Fig. 2 is a cross-sectional view of the oiler in its operative position within the casing.

The oiler comprises an integral body having a knurled head 1 provided with a chamfered lower edge 2, a threaded portion 3, a pilot 4 of reduced diameter and a stem 5. A washer 6 is slipped over the stem in its initial assembly and the end of the stem is then flattened in the shape of a spatula 7.

The casing 8 which receives the oiler is provided with a tapped hole or threaded bore 9 of limited depth, the outer edge of which is chamfered at 10 to correspond with the chamfered lower side 2 of the head of the oiler, and a counterbored hole 11 and a drilled hole 12 which lead to the parts to be oiled. The diameter of the counterbored hole 11 is slightly less than the outside diameter of the washer which is to be pressed into this counterbored hole. The washer is pressed into place when the oiler is initially screwed into the casting. The pilot seat on the body of the oiler prevents the washer from tipping when it is being forced into place.

The washer fits snugly in the unthreaded bore and cannot readily be removed because of the insufficient leverage afforded by the spatulated end of the stem.

It will be observed that a small reservoir is formed around the pilot between the washer and the bottom of the screw and the wall of the counterbore. This reservoir is adapted to receive a small quantity of oil. In other words, the washer forms the bottom of an oil receptacle which includes the walls of threaded bore 9 and counterbore 11.

The reservoir is filled by pulling out the oiler as far as it will go. The required amount of oil is run into the bore in the casing and the oiler permitted to fall back. Some of the oil will run down the stem into the narrow passage to the bearings, but the major portion will be retained in the counterbore or reservoir because of surface tension and capillary attraction, the hole in the washer being made but slightly greater than the diameter of the stem to assist this surface tension. Additional drops or quantities of oil may be injected into the passage by turning the screw down into the casing which, of course, exerts pressure on the oil and overcomes this surface tension. Thus only regulatable amounts of oil are fed into the mechanism, and the possibility of over-oiling overcome.

Having described our invention, what we claim is:

1. The combination with an internally threaded and bored casing, of an oiler comprising a screw having a spatulated stem, and a washer in said bore to prevent removal of said oiler.

2. The combination with an internally threaded and bored casing, of an oiler comprising a screw having a knurled head and a spatulated stem, and a washer in said bore to prevent removal of said oiler.

3. The combination with an internally threaded and bored casing, of an oiler comprising a screw having a pilot of reduced cross section and a spatulated stem, and a washer in said bore for preventing removal of said oiler.

4. In combination, a casing having an internally threaded section, a smooth bore, a reduced bore, an oiler comprising, integrally, a screw, a pilot of reduced cross section and a spatulated stem, and a washer interposed between said oiler and casing to prevent removal of said oiler.

5. An oiler comprising an oil receptacle having a bottom consisting of a perforated press-fit element, the perforation being of such restriction as to normally prevent oil escaping therethrough, and axially movable means for forcing oil through said perforation having a part passing through said perforation and cooperating with said element to prevent removal of said forcing means.

6. An oiler comprising an oil receptacle having its bottom consisting of a perforated press-fit element, a member passing through said perforation and so restricting it as to normally prevent oil escaping therefrom, and means for forcing oil from said receptacle through said perforation.

7. An oiler comprising an oil receptacle having a bottom consisting of a press-fit perforated element, a member passing therethrough and so restricting the perforation as to normally prevent oil escaping therethrough, said member being adapted to prevent removal of means adapted to force oil through said perforation.

8. An oiler comprising an oil receptacle having a perforated bottom, a member passing through said perforation and so restricting the perforation as to normally prevent oil escaping therethrough, and means for forcing oil from said receptacle through said perforation.

9. An oiler comprising an oil receptacle having a perforated bottom, a member passing through said perforation and so restricting the same as to normally prevent oil escaping therethrough, said member being adapted to prevent removal of means adapted to force oil through said perforation.

10. The combination with an oil receptacle having a perforated bottom, of a plunger therein having a part passing through said perforation and restricting the same so as to normally prevent the escape of oil therefrom, said plunger being operative to force the oil through said perforation.

11. The combination with an oil receptacle having a perforated bottom, of an irremovable plunger therein having a part passing through said perforation and restricting the same so as to normally prevent the escape of oil therethrough, said plunger being operative to force the oil through said perforation.

12. The combination with an oil receptacle having a perforated bottom, of a plunger therein having a part passing through said perforation and restricting the same so as to normally prevent the escape of oil therethrough, said part being adapted to prevent removal of said plunger from said receptacle and said plunger being operative to force oil through said perforation.

13. The combination with an oil receptacle having a perforated bottom, of a plunger therein having a part passing through said perforation and restricting the same so as to normally prevent the escape of oil therethrough, said part having a portion adapted to cooperate with the bottom of said receptacle to prevent removal of said plunger, and said plunger being operative to force oil through said perforation.

14. The combination with an oil receptacle having a perforated bottom, of a plunger therein having a stem passing through said perforation and spatulated to cooperate with the bottom of said receptacle to prevent removal of said plunger, said plunger being adapted to force oil through said perforation.

15. The combination with an oil receptacle having a perforated bottom, of a plunger therein having a stem passing through said perforation and restricting the same so as to normally prevent the escape of oil therethrough, the end of said stem being spatulated to prevent removal of said plunger, and said plunger being operative to force oil through said perforation.

In testimony whereof, we hereto affix our signatures.

JOHN F. MARTIN.
FRANK E. WATTS.